United States Patent
Nishizaki et al.

(10) Patent No.: US 6,927,548 B2
(45) Date of Patent: Aug. 9, 2005

(54) ELECTRIC POWER STEERING APPARATUS

(75) Inventors: Katsutoshi Nishizaki, Mie (JP); Takeshi Ueda, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/827,240

(22) Filed: Apr. 20, 2004

(65) Prior Publication Data

US 2004/0206571 A1 Oct. 21, 2004

(30) Foreign Application Priority Data

Apr. 21, 2003 (JP) .................................... P.2003-115926

(51) Int. Cl.[7] .............................................. H02P 7/00
(52) U.S. Cl. ...................... 318/432; 318/434; 318/433
(58) Field of Search ................................ 318/432, 433, 318/434; 180/446; 123/299

(56) References Cited

U.S. PATENT DOCUMENTS

| | | |
|---|---|---|
| 6,427,104 B1 | 7/2002 | Matsushita et al. |
| 2003/0233997 A1 * | 12/2003 | Kawaguchi et al. ........ 123/299 |
| 2004/0003957 A1 * | 1/2004 | Matsuoka et al. .......... 180/446 |

FOREIGN PATENT DOCUMENTS

| | | |
|---|---|---|
| EP | 1 308 368 A2 | 5/2003 |
| JP | 11-191992 | 7/1999 |
| JP | 2001-186790 | 7/2001 |

OTHER PUBLICATIONS

European Search Report dated Aug. 10, 2004.

* cited by examiner

*Primary Examiner*—Karen Masih
(74) *Attorney, Agent, or Firm*—McGinn & Gibb, PLLC (57) ABSTRACT

An electric power steering apparatus includes: a rotation speed detecting unit which detects a rotation speed of the electric motor; a compensation current determining unit which determines an instruction value of a compensation current to flow through the electric motor to suppress torque ripples due to distortion of an induced electromotive force waveform of the electric motor in accordance with a load correspondence quantity as a physical quantity corresponding to a load of the electric motor and the rotation speed detected by the rotation speed detecting unit; a correcting unit which corrects the current target value on the basis of the compensation current instruction value; and a control unit which performs a feedback control on the electric motor so that a current having the current target value as corrected by the correcting unit flows through the electric motor.

4 Claims, 8 Drawing Sheets

A: OUTPUT TORQUE (WITHOUT COMPENSATION; SET VALUE: +3 N.m)
B: OUTPUT TORQUE (WITH COMPENSATION; SET VALUE: +3 N.m)
C: q-AXIS COMPENSATION CURRENT
D: d-AXIS COMPENSATION CURRENT

ELECTRIC POWER STEERING APPARATUS

BACKGROUND OF THE INVENTION

The present invention relates to an electric power steering apparatus in which an electric motor gives steering assist force to a steering mechanism of a vehicle and, more specifically, to the reduction of torque ripples of the electric motor of an electric power steering apparatus.

Electric power steering apparatus in which steering assist force is given to a steering mechanism by driving an electric motor in accordance with steering torque that is applied to a steering wheel by a driver are used conventionally.

Incidentally, in electric motors, ripples necessarily occur in output torque. And the torque ripple is generally classified into one (called "mechanical ripple" or "cogging torque") that is caused by structural factors such as the number of poles and the number of slots of the motor and one (hereinafter referred to as "electric ripple") that is caused by deviation of an induced electromotive force waveform of the motor from its ideal waveform (a DC waveform in the case of a motor with a brush or a sinusoidal wave (for each phase) in the case of a 3-phase-sinusoidal-wave-driven brushless motor). In electric power steering apparatus, a complaint is sometimes made about deterioration in steering feeling due to torque ripples. And motor makers are making efforts to minimize torque ripples. However, of the above kinds of torque ripples, the electric ripple appears as ripples whose magnitude is proportional to the motor load (i.e., motor current or output torque) and hence is particularly problematic in electric power steering apparatus in which importance is attached to the smoothness of the motor output torque.

In the above circumstances, methods for reducing torque ripples by making improvements in the motor driving method were proposed in the art. For example, to reduce torque ripples in a 3-phase-sinusoidal-wave-driven brushless motor, a technique was proposed (refer to non-patent document 1) in which optimum d-axis and q-axis current waveforms (having periodic variations) for canceling out electric ripples due to distortion of induced electromotive force waveforms are determined on the basis of measurement data of no-load induced electromotive force (waveforms of those data are distorted from sinusoidal waves) This technique makes it possible to almost eliminate torque ripples in a constant-speed rotation state even with a load variation by increasing the amplitudes of compensation currents having the thus-determined d-axis and q-axis current waveforms in proportion to the load.

Patent Document 1
  JP-A-11-191992
Non-patent Document 1
  Yoshitada Chin and Takashi Sekiguchi, "High-Efficiency, Low-Torque Control of Permanent Magnet Synchronous Motor Using a Current that Follows Induced Electromotive Force Vectors," The Transactions D of The Institute of Electrical Engineers of Japan, The Institute of Electrical Engineers of Japan, Vol. 120, No. 4, pp. 559–565, 2000.

However, in motors used in electric power steering apparatus, the rotation speed varies every moment depending on not only the load variation but also the drive situation. Therefore, electric ripples cannot be reduced sufficiently by applying the above technique as it is to an electric power steering apparatus.

SUMMARY OF THE INVENTION

An object of the present invention is therefore to provide an electric power steering apparatus capable of reducing electric ripples sufficiently irrespective of the drive situation.

A first invention provides an electric power steering apparatus for giving steering assist force to a steering mechanism of a vehicle by driving an electric motor on the basis of a current target value that is determined in accordance with a manipulation for steering the vehicle, characterized by comprising:

a rotation speed detecting unit for detecting a rotation speed of the electric motor;

a compensation current determining unit for determining an instruction value of a compensation current to flow through the electric motor to suppress torque ripples due to distortion of an induced electromotive force waveform of the electric motor in accordance with a load correspondence quantity as a physical quantity corresponding to a load of the electric motor and the rotation speed detected by the rotation speed detecting unit;

a correcting unit for correcting the current target value on the basis of the compensation current instruction value determined by the compensation current determining unit; and a control unit for performing a feedback control on the electric motor so that a current having the current target value as corrected by the correcting unit flows through the electric motor, the control unit being part of a current control system of the electric motor that uses the feedback control.

In the first invention, the compensation current for suppressing torque ripples (electric ripples) is varied in accordance with not only the motor load but also the motor rotation speed. Therefore, even if the motor rotation speed varies every moment depending on not only the motor load variation but also the drive situation, proper compensation current can be supplied to the motor and electric ripples can be reduced sufficiently.

A second invention is characterized in that, in the first invention, the compensation current determining unit includes:

an amplitude determining unit for determining an amplitude of the compensation current instruction value so that an amplitude of the compensation current to flow through the electric motor becomes proportional to the load correspondence quantity; and an amplitude correcting unit for correcting the determined amplitude in accordance with the rotation speed so as to compensate for a gain reduction due to a frequency characteristic of the current control system.

In the second invention, not only is the amplitude of the compensation current for suppressing torque ripples (electric ripples) varied in proportion to the motor load, but also the amplitude of the compensation current instruction value is corrected so that a gain reduction due to the frequency characteristic of the current control system is compensated for. Therefore, even if the motor rotation speed varies every moment depending on not only the motor load variation but also the drive situation, compensation current having a proper amplitude can be supplied to the motor, whereby electric ripples can be suppressed sufficiently.

A third invention is characterized in that, in the second invention, the compensation current determining unit further includes a phase correcting unit for correcting a phase of the compensation current instruction value in accordance with the rotation speed so as to compensate for a phase delay due to the frequency characteristic of the current control system.

In the third invention, the phase of the compensation current instruction value is corrected so that a phase delay due to the frequency characteristic of the current control system is compensated for. Therefore, even if the motor rotation speed varies every moment depending on the drive situation, compensation current having a proper phase can be supplied to the motor, whereby electric ripples can be suppressed more sufficiently.

A fourth invention is characterized in that, in the first invention, the compensation current determining unit includes an amplitude determining unit for determining an amplitude of the compensation current instruction value so that an amplitude of the compensation current to flow through the electric motor becomes proportional to the load correspondence quantity; and a phase correcting unit for correcting a phase of the compensation current instruction value in accordance with the rotation speed so as to compensate for a phase delay due to the frequency characteristic of the current control system.

In the fourth invention, not only is the amplitude of the compensation current for suppressing torque ripples (electric ripples) varied in proportion to the motor load, the phase of the compensation current instruction value is corrected so that a phase delay due to the frequency characteristic of the current control system is compensated for. Therefore, even if the motor rotation speed varies every moment depending on the drive situation, compensation current having a proper phase can be supplied to the motor, whereby electric ripples can be suppressed sufficiently.

DETAILED DESCRIPTION OF PREFERRED EMBODIMENTS

An embodiment of the present invention will be hereinafter described with reference to the accompanying drawings.

<1. Entire Configuration>

Figure 1:
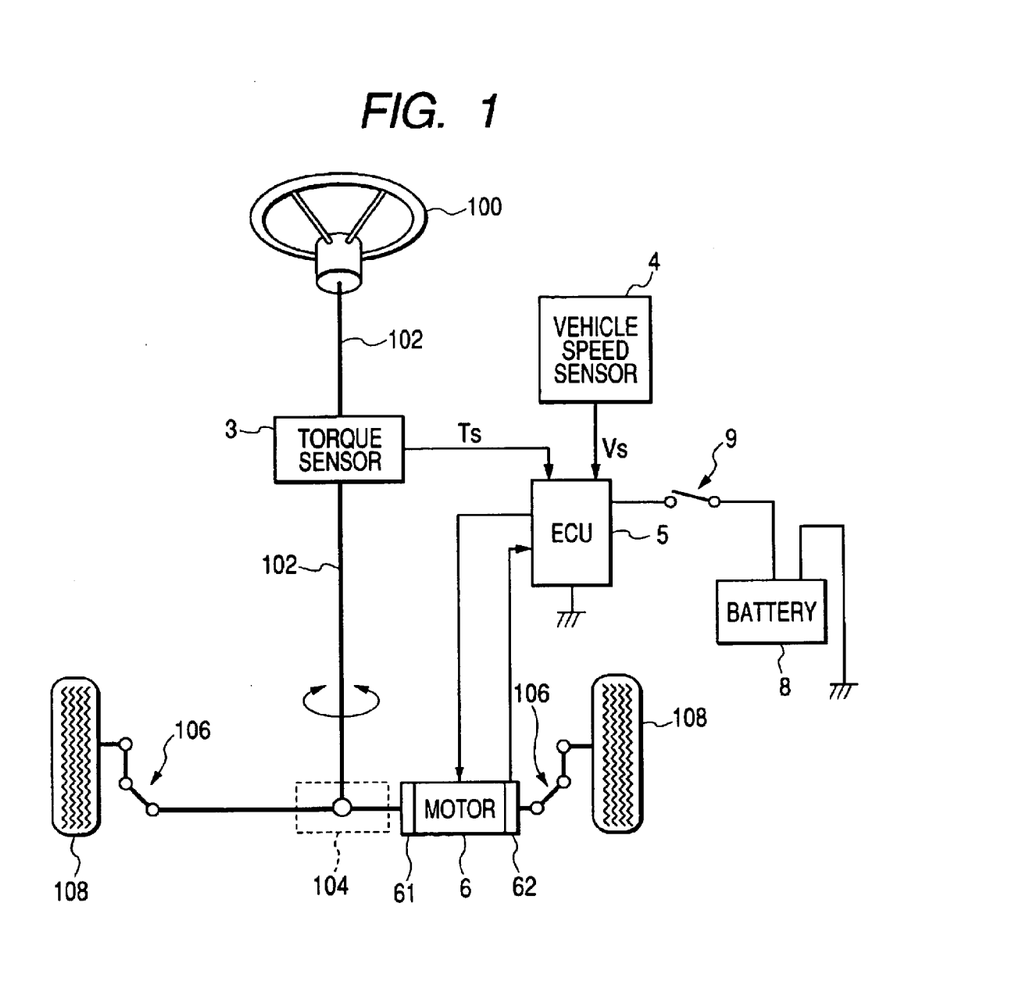
FIG. 1 is a schematic diagram showing the configuration of an electric power steering apparatus according to an embodiment of the present invention together with a related part of a vehicle configuration.

FIG. 1 is a schematic diagram showing the configuration of an electric power steering apparatus according to an embodiment of the invention together with a related part of a vehicle configuration. This electric power steering apparatus is equipped with a steering shaft 102 one end of which is fastened to a steering wheel 100 that is a manipulating unit for steering, a rack-pinion mechanism 104 that is linked to the other end of the steering shaft 102, a torque sensor 3 for detecting steering torque that is applied to the steering shaft 102 as a result of a manipulation on the steering wheel 100, a brushless motor 6 for generating steering assist force for reducing the load on the driver when he or she performs a steering wheel manipulation (steering manipulation), a ball thread driving unit 61 for transmitting the steering assist force to a rack shaft, a position detecting sensor 62 such as a resolver for detecting a rotation position of the rotor of the brushless motor 6, and an electronic control unit (ECU) 5 that is supplied with electric power from a vehicle battery via an ignition switch 9 and controls the driving of the motor 6 on the basis of sensor signals from the torque sensor 3, a vehicle speed sensor 4, and the position detecting sensor 62. When the driver manipulates the steering wheel 100 in the vehicle that is mounted with the above electric power steering apparatus, the torque sensor 3 detects steering torque of the manipulation and outputs a steering torque signal Ts indicating the steering torque. On the other hand, the vehicle speed sensor 4 detects a speed of the vehicle (vehicle speed) and outputs a vehicle speed signal Vs indicating the vehicle speed. The ECU 5 as a controller drives the motor 6 on the basis of the steering torque signal Ts, the vehicle speed signal Vs, and a rotor rotation position that is detected by the position detecting sensor 62. As a result, the motor 6 generates steering assist force, which is applied to the rack shaft via the ball thread driving unit 61, whereby the load on the driver is reduced in his or her steering manipulation. That is, the rack shaft is reciprocated by the sum of the steering force of the steering torque resulting from the steering wheel manipulation and the steering assist force generated by the motor 6. The two ends of the rack shaft is linked to each wheel 108 via a link member that is composed of a tie rod and a knuckle arm. The direction of the wheels 108 is changed as the rack shaft is reciprocated.

<2. Outline of Motor Control>

The motor 6 of this embodiment is a sinusoidal-wave-driven brushless motor that is composed of a rotor (hereinafter also referred to as "rotary field magnet") as a field magnet that is a permanent magnet and a stator having 3-phase coils (u phase, v phase, and w phase).

Figure 2:
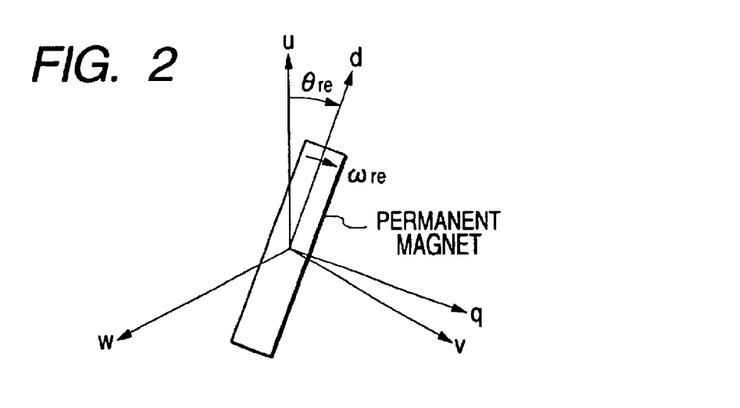
FIG. 2 is a schematic diagram illustrating a 3-phase AC coordinate system and a d-q coordinate system in a 3-phase brushless motor.

Target values of currents to flow through the u-phase, v-phase, and w-phase coils to cause the motor 6 to generate proper steering assist force, that is, current instruction values of the respective phases, are given by the following equations:

$$i^*_u = I^* \sin \theta_{re} \quad (1a)$$

$$i^*_v = I^* \sin (\theta_{re} - 2\pi/3) \quad (1b)$$

$$i^*_w = I^* \sin (\theta_{re} - 4\pi/3) = -i^*_u - i^*_v \quad (1c)$$

where $i^*_u$ is the u-phase current instruction value, $i^*_v$ is the v-phase current instruction value, $i^*_w$ is the w-phase current instruction value, and $\theta_{re}$ is the angle (called "electric angle") of the rotary field as measured clockwise with respect to the u-phase coil (see FIG. 2). The electric angle $\theta_{re}$ is given by $\theta_{re} = p \cdot \theta_m$ where $\theta_m$ is the mechanical angle of the rotor and the number of poles is equal to 2p.

Usually, an instruction value of a voltage that should be applied to a brushless motor is obtained by a control calculation based on a deviation between a current target value and a motor current detection value. To reduce a phase delay, in this control calculation current instruction values are expressed by in a d-q coordinate system and a voltage instruction value is calculated on the basis of d-axis and q-axis current instruction values. The d-q coordinate system is a rotating coordinate system that rotates in synchronism with a rotary field magnet (rotor) that is a permanent magnet. The d axis is in the magnetic flux direction of the rotary field and the q axis is in the direction that is perpendicular to the d axis. Although the current instruction values $i^*_u$, $i^*_v$, and $i^*_w$ of the respective phases are AC values, in the d-q coordinate system the current instruction values are expressed as DC values.

The current instruction values of the respective phases of Equations (1a)–(1c) are expressed as follows in the d-q coordinate system:

$$i^*_d = 0 \quad (2a)$$

$$i^*_q = \sqrt{3/2} \cdot I^* \quad (2b)$$

where $i^*_d$ and $i^*_q$ are the d-axis and q-axis current instruction values, respectively.

On the other hand, as for motor currents, a d-axis current detection value $i_d$ and a q-axis current detection value $i_q$ are calculated as follows from detection results of a u-phase current and a v-phase current that are obtained by current detectors:

$$i_d = \sqrt{2}\{i_v \sin \theta_{re} - i_u \sin (\theta_{re} - 2\pi/3)\} \quad (3a)$$

$$i_q = \sqrt{2}\{i_v \cos \theta_{re} - i_u \cos (\theta_{re} - 2\pi/3)\} \quad (3b)$$

where $i_u$ is the u-phase current detection value, $i_v$ is the v-phase current detection value, and $\theta_{re}$ is the above-mentioned electric angle.

In this embodiment, a current control unit 200 (described later) performs a feedback control on the motor 6 so that a deviation $e_d = i^*_d - i_d$ between the instruction value $i^*_d$ and the detection value $i_d$ of the d-axis current and a deviation $e_q = i^*_q - i_q$ between the instruction value $i^*_q$ and the detection value $i_q$ of the q-axis current are canceled out.

<3. Configuration of Controller>

Figure 3:
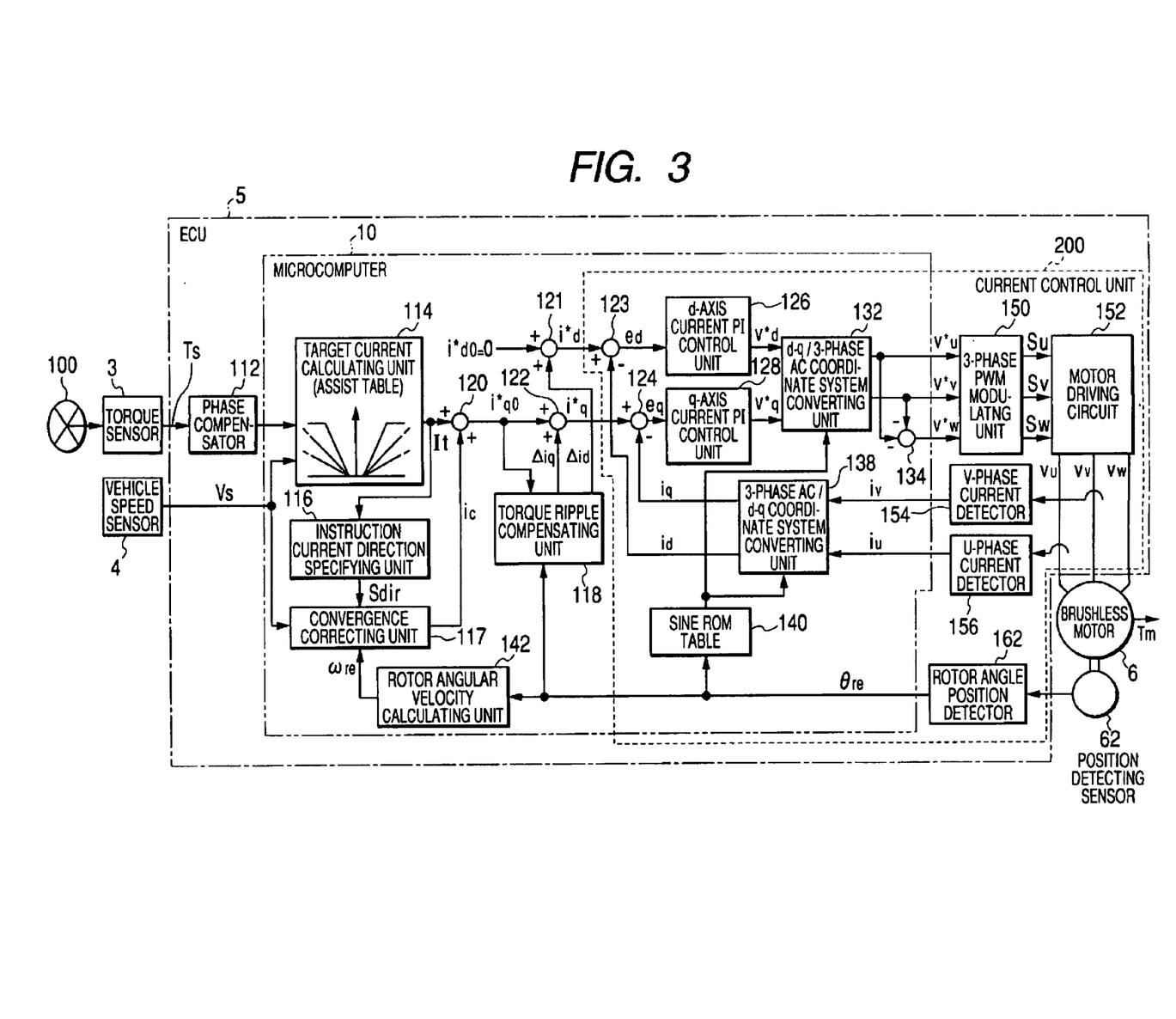
FIG. 3 is a block diagram showing the configuration of an ECU that is a controller of the electric power steering apparatus according to the embodiment.

In this embodiment, the above-described feedback control is performed on the motor 6 in the ECU 5 that is a controller of the electric power steering apparatus. FIG. 3 is a block diagram showing the configuration of the ECU 5. The ECU 5 is composed of a phase compensator 112, a microcomputer 10, and a motor driving unit. By executing prescribed programs stored in an internal memory, the microcomputer 10 functions as a motor control unit that consists of a target current calculating unit 114, an instruction current direction specifying unit 116, a convergence correcting unit 117, a torque ripple compensating unit 118, adders 120, 121, and 122, subtracters 123 and 124, a d-axis current PI control unit 126, a q-axis current PI control unit 128, a d-q/3-phase AC coordinate system converting unit 132, a sign-inverting adder 134, a 3-phase AC/d-q coordinate system converting unit 138, a sine ROM table 140, and a rotor angular velocity calculating unit 142. The motor driving unit, which is hardware (i.e., circuits) for driving the 3-phase (u phase, v phase, and w phase) brushless motor 6 on the basis of voltage instruction values that are output from the microcomputer 10 as the motor control unit, is composed of a 3-phase PWM modulating unit 150, a motor driving circuit 152, a u-phase current detector 156, a v-phase current detector 154, and a rotor angle position detector 162.

In this embodiment, steering torque that is applied to the steering shaft 102 as a result of a manipulation on the steering wheel 100 is detected by the torque sensor 3 and a steering torque signal Ts that is output from the torque sensor 3 is input to the ECU 5. Further, a vehicle speed is detected by the vehicle speed sensor 4 and a vehicle speed signal Vs that is output from the vehicle speed sensor 4 is input to the CPU 5. In the ECU 5, the phase compensator 112 performs phase compensation on the received steering torque signal Ts and a phase-compensated signal is input to the target current calculating unit 114. On the other hand, the vehicle speed signal Vs that is output from the vehicle speed sensor 4 is input to the target current calculating unit 114 and the convergence correcting unit 117 of the ECU 5. A sensor signal Sr that is output from the position detecting sensor 62 attached to the motor 6 is input to the rotor angle position detector 162, which outputs a signal indicating a rotation position of the rotary field magnet (permanent magnet) that is the rotor of the motor 6, that is, an electric angle $\theta_{re}$. The signal indicating the electric angle $\theta_{re}$ is input to the sine ROM table 140 and the rotor angular velocity calculating unit 142.

The target current calculating unit 114 calculates a current target value It, i.e., a value of current to be supplied to the motor 6, on the basis of the steering torque signal Ts and the vehicle speed signal Vs. More specifically, the target current calculating unit 114 calculates a current target value It by referring to a table (called "assist map") that is stored in advance in the target current calculating unit 114 and indicates a relationship between the steering torque and the target value of current to be supplied to the motor 6 to generate proper steering assist force with the vehicle speed as a parameter. The current target value It is a sign-added value indicating a current instruction value corresponding to a q-axis current that is given by the above-mentioned Equation (2b). The sign (positive or negative) indicates a steering assistance direction, that is, which of torque in a direction of assisting rightward steering or torque in a direction of assisting leftward steering to cause the motor 6 to generate.

The instruction current direction specifying unit 116 generates a signal indicating a sign (positive or negative) of the current target value It, that is, a signal Sdir indicating a steering assistance direction (hereinafter referred to as "direction signal") The direction signal Sdir is input to the convergence correcting unit 117. The rotor angular velocity calculating unit 142 a rotor angular velocity $\omega_{re}$ on the basis of the signal indicating the electric angle $\theta_{re}$ corresponding to the rotor angle. A signal indicating the rotor angular velocity $\omega_{re}$ is also input to the convergence correcting unit 117. On the basis of this signal and the vehicle speed signal Vs, the convergence correcting unit 117 calculates a compensation current value $i_c$ to be used for securing high vehicle convergence. The adder 120 adds the compensation current value $i_c$ to the current target value It, and outputs a resulting addition value as a q-axis basic current instruction value $i^*_{q0}$. The q-axis basic current instruction value $i^*_{q0}$, which is a current instruction value corresponding to torque that the motor 6 should generate for steering assistance, is input to the adder 122. On the other hand, a d-axis basic current instruction value $i^*_{d0} = 0$ is input to the adder 121 because a d-axis current is irrelevant to torque.

The torque ripple compensating unit 118, which functions as a compensation current determining mean for determining instruction values of compensation currents to flow through the motor 6 to suppress torque ripples (hereinafter also referred to as "electric ripples") resulting from distortion of induced electromotive force waveforms in the motor 6, determines, as compensation current instruction values, a d-axis current compensation value $\Delta i_d$ and a q-axis current compensation value $\Delta i_q$ on the basis of the electric angle $\theta_{re}$ and the q-axis basic current instruction value $i^*_{q0}$ (described later in detail). The current compensation values $\Delta i_d$ and $\Delta i_q$ are input to the respective adders 121 and 122. The adder 121 calculates a d-axis current instruction value $i^*_d$ by adding the received d-axis current compensation value $\Delta i_d$ to the d-axis basic current instruction value $i^*_{d0}$. The adder 122 calculates a q-axis current instruction value $i^*_q$ by adding the received q-axis current compensation value $\Delta i_q$ to the q-axis basic current instruction value $i^*_{q0}$. That is, $$i^*_d = i^*_{d0} + \Delta i_d \quad (4a)$$

$$i^*_q = i^*_{q0} + \Delta i_q. \quad (4b)$$

Equations (4a) and (4b) show that the target values of currents to flow through the motor 6 to obtain proper steering assist force are corrected on the basis of the d-axis current compensation value $\Delta i_d$ and the q-axis current compensation value $\Delta i_q$ to suppress electric ripples.

The u-phase current detector 156 and the v-phase current detector 154 detects a u-phase current and a v-phase current, respectively, among currents that are supplied from the motor driving circuit 152 to the motor 6, and outputs a u-phase current detection value $i_u$ and a v-phase current detection value $i_v$, respectively. The sine ROM table 140, which stores values of the angle $\theta$ and values of sin $\theta$ in such a manner that they are correlated with each other, outputs a sine value sin $\theta_{re}$ corresponding to an electric angle $\theta_{re}$ that is indicated by the signal supplied from the rotor angle position detector 162. The 3-phase AC/d-q coordinate system converting unit 138 converts the above-mentioned u-phase current detection value $i_u$ and v-phase current detection value $i_v$ into values in the d-q coordinate system, that is, a d-axis current detection value $i_d$ and a q-axis current detection value $i_q$ according to Equations (3a) and (3b) (shown below) using the sine value sin $\theta_{re}$.

$$i_d = \sqrt{2}\{i_v \sin \theta_{re} - i_u \sin (\theta_{re} - 2\pi/3)\}$$

$$i_q = \sqrt{2}\{i_v \cos \theta_{re} - i_u \cos (\theta_{re} - 2\pi/3)\}$$

The d-axis current detection value $i_d$ and the q-axis current detection value $i_q$ are input to the respective subtracters 123 and 124.

The subtracter 123 calculates a d-axis current deviation $e_d = i^*_d - i_d$ that is a deviation between the d-axis current instruction value $i^*_d$ supplied from the adder 121 and the d-axis current detection value $i_d$ supplied from the 3-phase AC/d-q coordinate system converting unit 138. The d-axis current PI control unit 126 calculates a d-axis voltage instruction value $v^*_d$ by performing a proportional-plus-integral control operation on the d-axis current deviation $e_d$. On the other hand, the subtracter 124 calculates a q-axis current deviation $e_q = i^*_q - i_q$ that is a deviation between the q-axis current instruction value $i^*_q$ supplied from the adder 122 and the q-axis current detection value $i_q$ supplied from the 3-phase AC/d-q coordinate system converting unit 138. The q-axis current PI control unit 128 calculates a q-axis voltage instruction value $v^*_q$ by performing a proportional-plus-integral control operation on the q-axis current deviation $e_q$. That is, the PI control units 126 and 128 calculates a d-axis voltage instruction value $V^*_d$ and a q-axis voltage instruction value $v^*_q$ according to the following equations:

$$v^*_d = K_p\{e_d + (1/T_i)\int e_d dt\} \quad (5a)$$

$$v^*_q = K_p\{e_q + (1/T_i)\int e_q dt\} \quad (5b)$$

where $K_p$ is a proportional gain and $T_i$ is an integration time.

The d-q/3-phase AC coordinate system converting unit 132 converts the d-axis voltage instruction value $v^*_d$ and the q-axis voltage instruction value $v^*_q$ into a u-phase voltage instruction value $v^*_u$ and a v-phase voltage instruction value $v^*_v$ in the 3-phase AC coordinate system. The sign-inverting adder 134 calculates a w-phase voltage instruction value $v^*_w$ on the basis of the u-phase and v-phase voltage instruction values $v^*_u$ and $v^*_v$. That is, voltage instruction values $v^*_u$, $v^*_v$, and $v^*_w$ of the respective phases are calculated according to the following equations:

$$v^*_u = \sqrt{2/3}\{v^*_d \cos \theta_{re} - v^*_q \sin \theta_{re}\} \quad (6a)$$

$$v^*_v = \sqrt{2/3}\{v^*_d \cos (\theta re - 2\pi/3) - v^*_q \sin (\theta_{re} - 2\pi/3)\} \quad (6b)$$

$$v^*_w = -v^*_u - v^*_v. \quad (6c)$$

The 3-phase PWM modulating unit 150 generates PWM signals Su, Sv, and Sw whose duty ratios reflect the thus-calculated voltage instruction values $v^*_u$, $v^*_v$, and $v^*_w$ of the respective phases.

The motor driving circuit 152, which is, for example, a PWM voltage type inverter using such switching elements as power MOS transistors, generates voltages $v_u$, $v_v$, and $v_w$ of the respective phases to be applied to the brushless motor 6 by turning on and off the switching elements according to the PWM signals Su, Sv, and Sw. The voltages $v_u$, $v_v$, and $v_w$ of the respective phases are output from the ECU 5 and applied to the motor 6. Currents flow through the u-phase, v-phase, and w-phase coils (not shown) of the motor 6 according to the voltages $v_u$, $v_v$, and $v_w$, and the motor 6 generates torque Tm for steering assistance according to those currents.

Among the currents flowing through the motor 6, as described above, the u-phase current $i_u$ and the v-phase current $i_v$ are detected by the u-phase current detector 156 and the v-phase current detector 154, respectively, and then converted into current values $i_d$ and $i_q$ in the d-q coordinate system by the 3-phase AC/d-q coordinate system converting unit 138. Of the d-axis and q-axis current values $i_d$ and $i_q$ in the d-q coordinate system are input to the subtracters 123 and 124, respectively. To cause the motor 6 to generate desired steering assist force, a feedback control (called "current control") is performed so that the d-axis and q-axis current detection value $i_d$ and $i_q$ become equal to the d-axis and q-axis current instruction values $i^*_d$ and $i^*_q$, respectively.

<4. Current Control System>

As described above, in this embodiment, target values of motor currents are set so that steering assistance is effected properly in accordance with steering torque and a vehicle speed. The target values are corrected for the purpose of electric ripple compensation, for example, and a feedback control is performed so that currents having corrected target values (i.e., d-axis and q-axis current instruction values $i^*_d$ and $i^*_q$) flow through the motor 6. The part 200 (hereinafter referred to as "current control unit") of the ECU 5 that performs the above current control is enclosed by a broken line in FIG. 3. In this embodiment, the motor driving unit of the current control unit 200 which is a control unit for the motor 6 is implemented by hardware, and the other parts is implemented by software, that is, by executing prescribed programs with the microcomputer 10 in the above-described manner. The current control unit 200, the motor 6, and the position detecting sensor 62 constitute a current control system having a feedback loop.

Figure 7:
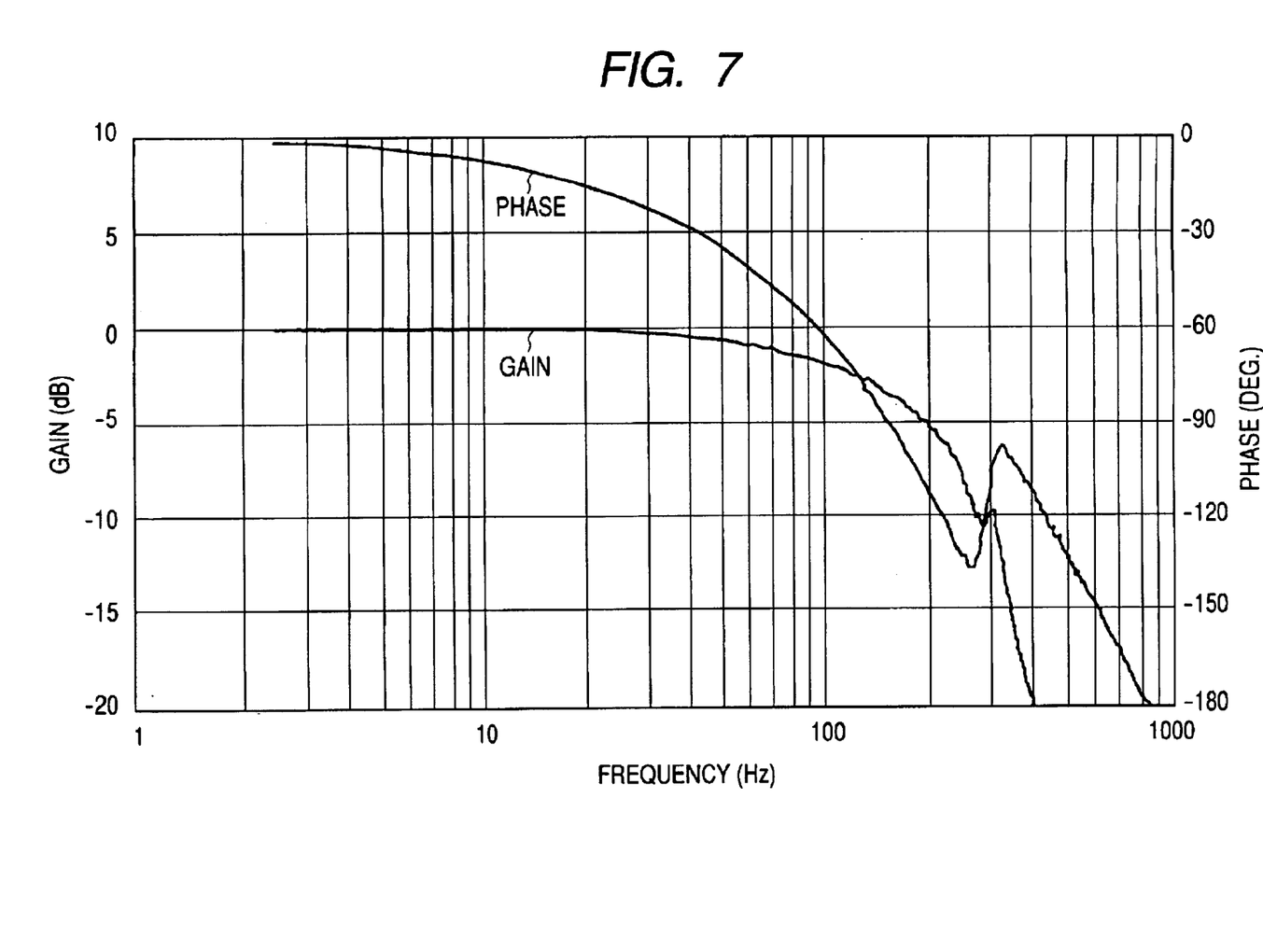
FIG. 7 is a Bode diagram showing a frequency characteristic of a current control system according to the embodiment.

FIG. 7 is a Bode diagram showing a frequency characteristic of the current control system. The Bode diagram of FIG. 7 relating to the closed-loop transfer function of the current control system is applicable to either of a case that the input is the d-axis current instruction value $i^*_d$ and the output is the d-axis current detection value $i_d$ and a case that the input is the q-axis current instruction value $i^*_q$ and the output is the q-axis current detection value $i_q$. As shown in FIG. 7, in a practical frequency range the current control system has a frequency characteristic that the gain decreases from 1 (0 in dB) and the phase delay increases as the frequency increases.

<5. Configuration and Operation of Torque Ripple Compensating Unit>

Figure 4:
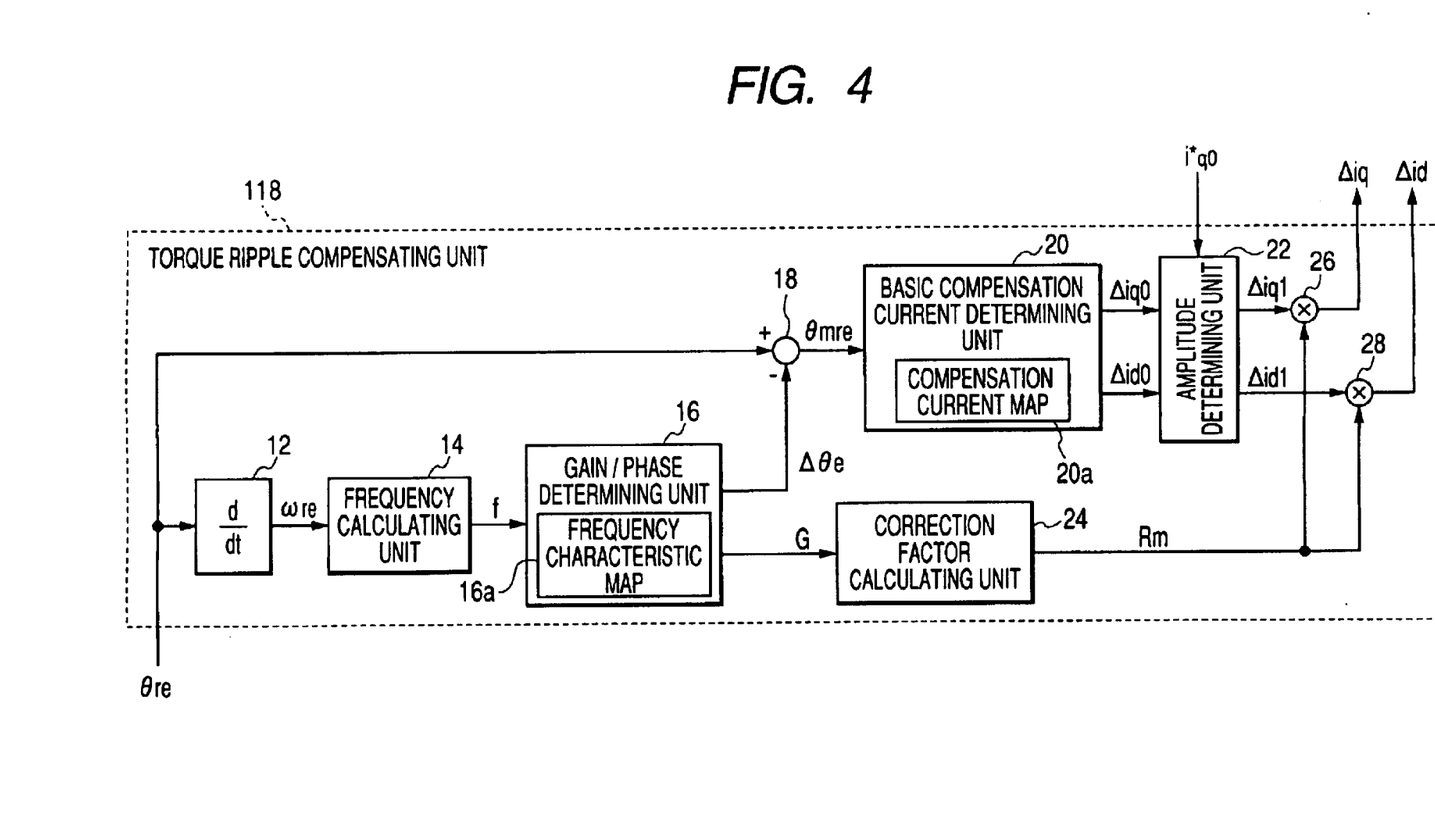
FIG. 4 is a block diagram showing the functional configuration of a torque ripple compensating unit according to the embodiment.

As described above, instruction values of the compensation currents to flow through the motor 6 to suppress electric ripples, that is, a d-axis current compensation value $\Delta i_d$ and a q-axis current compensation value $\Delta i_q$ are determined by the torque ripple compensating unit 118. In this embodiment, the torque ripple compensating unit 118 is also implemented by software by executing a prescribed program with the microcomputer 10. FIG. 4 is a block diagram showing the functional configuration of the torque ripple compensating unit 118. The torque ripple compensating unit 118 is equipped with a differentiator 12, a frequency calculating unit 14, a gain/phase determining unit 16, a subtracter 18, a basic compensation current determining unit 20, an amplitude determining unit 22, a correction factor calculating unit 24, and two multipliers 26 and 28. A signal indicating an electric angle $\theta_{re}$ is input to the differentiator 12 and the subtracter 18, and a q-axis basic current instruction value $i^*_{q0}$ is input to the amplitude determining unit 22.

The differentiator 12 calculates a rotor angular velocity $\omega_{re}$, that is, a value corresponding to a rotation angular velocity of the motor 6 (i.e., electric-angle-converted rotation angular velocity), by differentiating the signal indicating the electric angle $\theta_{re}$. The frequency calculating unit 14 calculates a frequency f (corresponds to a frequency of compensation currents) of electric ripples of the motor 6 on the basis of the rotor angular velocity $\omega_{re}$. That is, a frequency f is calculated according to the following equation:

$$f = S \cdot \omega_{re}/2\pi \quad (7)$$

where S is the number of slots of the motor 6.

The gain/phase determining unit 16 retains a frequency characteristic map corresponding to the Bode diagram of FIG. 7, that is, a frequency characteristic map 16a representing the frequency characteristic of the current control system (more specifically, data corresponding to the frequency characteristic map 16a are stored in advance in a memory provided inside the microcomputer 10). The gain/phase determining unit 16 determines a gain G and a phase difference $\Delta\theta_e$ of the current control system that correspond to the frequency f by referring to the frequency characteristic map 16a. As mentioned above, in the current control system, the gain decreases from 1 and the phase delay increases as the frequency increases. Therefore, the gain G determined by the gain/phase determining unit 16 is lower than or equal to 1 (has a negative value in dB) and the phase difference $\Delta\theta_e$ has a negative value. The gain G and the phase difference $\Delta\theta_e$ are input to the correction factor calculating unit 24 and the subtracter 18, respectively.

The subtracter 18 subtracts the phase difference $\Delta\theta_e$ from the electric angle $\theta_{re}$ and outputs a subtraction result $\theta_{re} - \Delta\theta_e$ as a corrected electric angle $\theta_{mre}$. This subtraction means compensation for the phase delay of the frequency characteristic of the current control system. The corrected electric angle $\theta_{mre}$ obtained through the compensation for the phase delay of the current control system is input to the basic compensation current determining unit 20.

The basic compensation current determining unit 20 retains, as a compensation current map 20a, a table representing a relationship between the electric angle and the d-axis and q-axis current compensation values (more specifically, data corresponding to the compensation current map 20a are stored in advance in a memory provided inside the microcomputer 10). The basic compensation current determining unit 20 determines a d-axis current unit compensation value $\Delta i_{d0}$ and a q-axis current unit compensation value $\Delta i_{q0}$ corresponding to the corrected electric angle $\theta_{mre}$ by referring to the compensation current map 20a. A method for generating the compensation current map 20a will be described below.

Torque ripples (electric ripples) occur if sinusoidal currents are caused to flow as currents $i_u$, $i_v$, and $i_w$ of the respective phases in a state that no-load induced electromotive force waveforms of the motor 6 are distorted. However, as described in non-patent document 1, currents $i_u$, $i_v$, and $i_w$ of the respective phases capable of keeping the output torque of the motor 6 at a constant value (e.g., 1 N.m) and preventing electric ripples can be determined if no-load induced electromotive force instantaneous values $e_{0u}$, $e_{0v}$, and $e_{0w}$ of the respective phases at each time point are known. For example, current values $i_u$, $i_v$, and $i_w$ of the respective phases capable of keeping the output torque of the motor 6 at a constant value T and preventing electric ripples can be determined according to the following equations:

$$i_u = \{(e_{0u} - e_{0v}) + (e_{0u} - e_{0w})\}T / \quad (8a)$$
$$\{(e_{0u} - e_{0v})^2 + (e_{0u} - e_{0w})^2 + (e_{0w} - e_{0v})^2\}$$

$$i_v = \{T - (e_{0u} - e_{0w})i_u\}/(e_{0v} - e_{0w}) \quad (8b)$$

$$i_w = \{T - (e_{0u} - e_{0v})i_u\}/(e_{0w} - e_{0v}) \quad (8c)$$

A d-axis current value $i_d$ and a q-axis current value $i_q$ capable of keeping the output torque of the motor 6 at the constant value T without causing electric ripples can be determined by converting the current values $i_u$, $i_v$, and $i_w$ of the respective phases obtained according to the above equations into values in the d-q coordinate system according to the following equations:

$$i_d = \sqrt{2}\{i_v \sin\theta - i_u \sin(\theta - 2\pi/3)\} \quad (9a)$$

$$i_q = \sqrt{2}\{i_v \cos\theta - i_u \cos(\theta - 2\pi/3)\} \quad (9b)$$

where $\theta$ is the electric angle.

Figure 5:
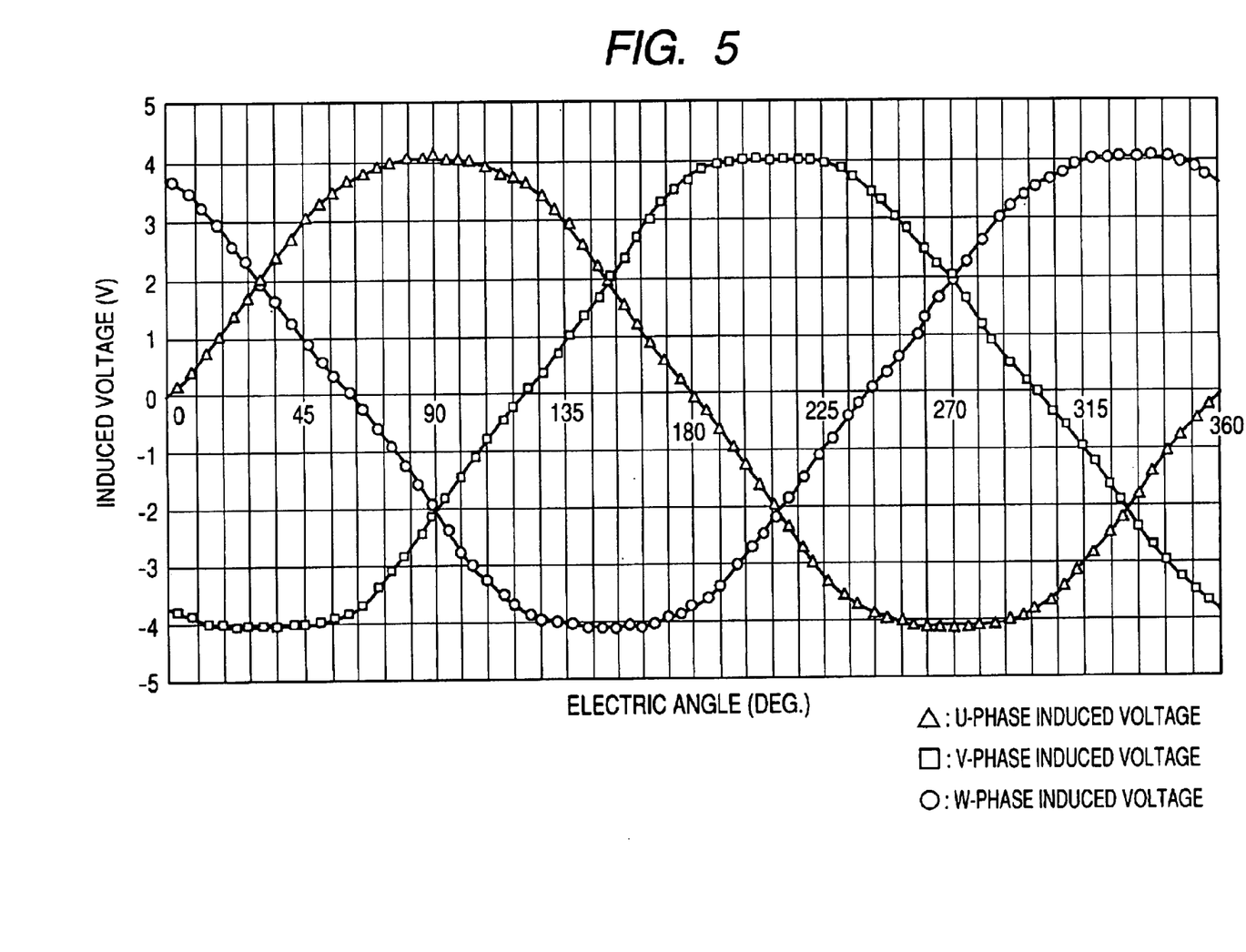
FIG. 5 is a voltage waveform graph of no-load induced electromotive forces (i.e., induced voltages) of the brushless motor according to the embodiment.
Figure 6:
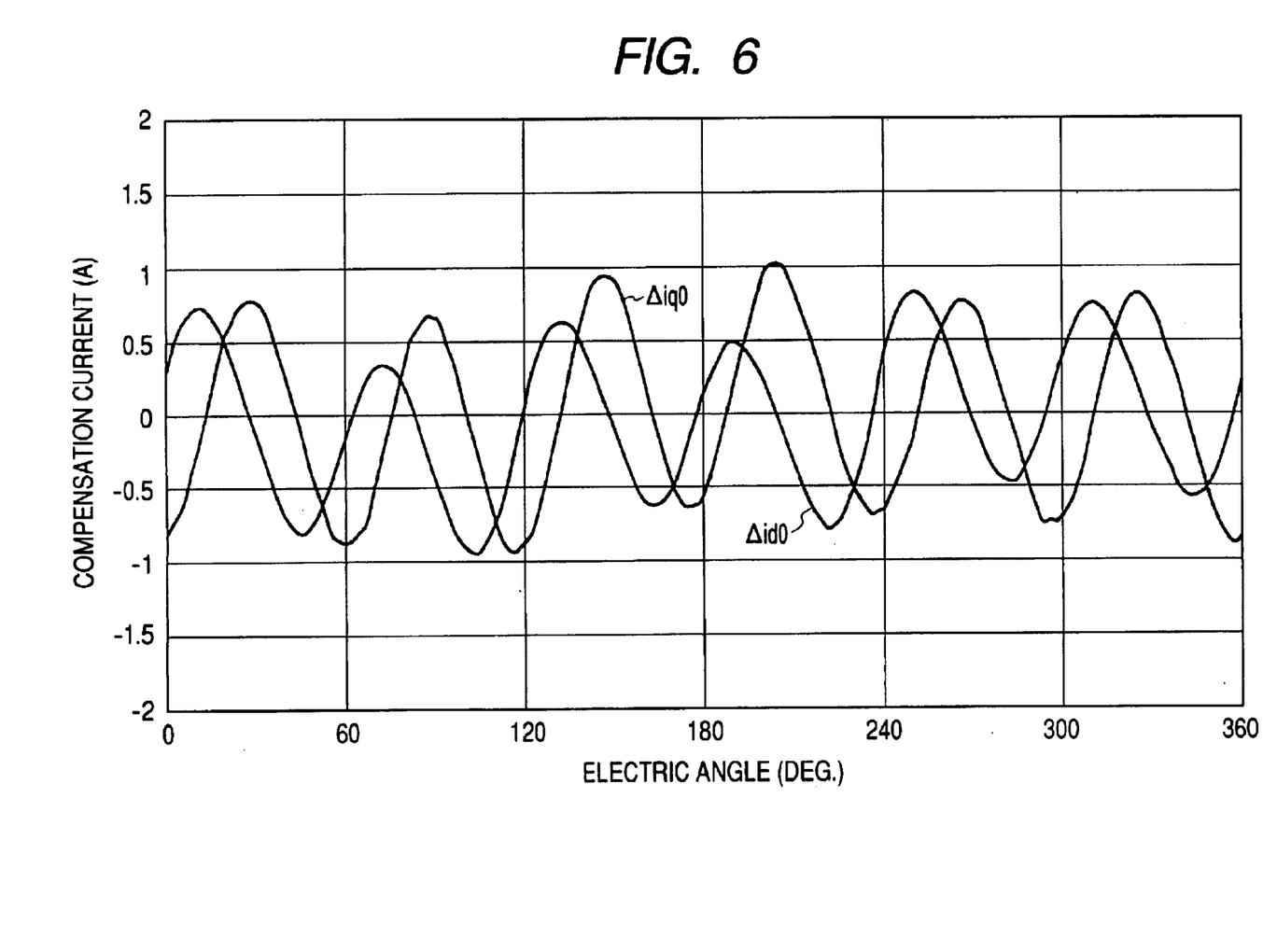
FIG. 6 is a current waveform graph of compensation currents to flow through the motor for torque ripple compensation in the embodiment.

In this embodiment, a compensation current map 20a is generated in the following manner. First, as shown in FIG. 5, measurement data of no-load induced electromotive force (i.e., induced voltage) instantaneous values $e_{0u}$, $e_{0v}$, and $e_{0w}$ of the respective phases of the motor 6 are acquired in advance for various electric angle values. Then, a d-axis current value $i_{d01}$ and a q-axis current value $i_{q01}$ that the motor 6 requires to output unit torque (1 N.m) without causing electric ripples are calculated by using the measurement data (refer to Equations (8a)–(9b)), and a d-axis current value $i_{d02}$ and a q-axis current value $i_{q02}$ that the motor 6 requires to output unit torque in the case where the no-load induced electromotive force waveforms are not distorted (in this case, a d-axis current value $i_{d02}$ and a q-axis current value $i_{q02}$ can be determined easily because the output torque is proportional to the q-axis current and the d-axis current can be set at 0). Differences between the two kinds of current values, $\Delta i_{d0}=i_{d01}-i_{d02}$ and $\Delta i_{q0}=i_{q01}-i_{q02}$, are employed as a d-axis current unit compensation value $\Delta i_{d0}$ and a q-axis current unit compensation value $\Delta i_{q0}$. A table that correlates the unit compensation values $\Delta i_{d0}$ and $\Delta i_{q0}$ with the various electric angle values is stored in the memory in advance as a compensation current map 20a. For example, d-axis current unit compensation values $\Delta i_{d0}$ and q-axis current unit compensation values $\Delta i_{q0}$ that are correlated with electric angle values as shown in FIG. 6 are determined on the basis of measurement data of no-load induced electromotive force waveforms as shown in FIG. 5, and a compensation current map 20a is generated on the basis of those values.

The basic compensation current determining unit 20 determines a q-axis current unit compensation value $\Delta i_{q0}$ and a d-axis current unit compensation value $\Delta i_{d0}$ corresponding to the above-mentioned corrected electric angle $\theta_{mre}$ by referring to the compensation current map 20a that was generated in the above-described manner. The thus-determined q-axis current unit compensation value $\Delta i_{q0}$ and the d-axis current unit compensation value $\Delta i_{d0}$ are input to the amplitude determining unit 22 as current compensation values per unit torque.

If output torque of the motor 6 is T, a q-axis current compensation value $\Delta i_q$ and a d-axis current compensation value $\Delta i_d$ to flow through the motor 6 to suppress electric ripples are equal to T times the q-axis current unit compensation value $\Delta i_{q0}$ and the d-axis current unit compensation value $\Delta i_{d0}$. Therefore, a q-axis current compensation value $\Delta i_q$ and a d-axis current compensation value $\Delta i_d$ can be obtained by multiplying the q-axis current unit compensation value $\Delta i_{q0}$ and the d-axis current unit compensation value $\Delta i_{d0}$ by a coefficient that depends on a physical quantity corresponding to a motor load. For example, a q-axis current compensation value $\Delta i_q$ and a d-axis current compensation value $\Delta i_d$ may be calculated as values that are proportional to a motor load by multiplying the q-axis current unit compensation value $\Delta i_{q0}$ and the d-axis current unit compensation value $\Delta i_{d0}$ by a coefficient that depends on a q-axis current detection value $i_q$ or a q-axis basic current instruction value $i^*_{q0}$ that corresponds to output torque of the motor 6. The amplitude determining unit 22 of this embodiment determines a q-axis current basic compensation value $\Delta i_{q1}$ and a d-axis current basic compensation value $\Delta i_{d1}$ by determining a motor torque value corresponding to a received q-axis basic current instruction value $i^*_{q0}$ and multiplying the q-axis current unit compensation value $\Delta i_{q0}$ and the d-axis current unit compensation value $\Delta i_{d0}$ by the determined torque value. The thus-determined q-axis current basic compensation value $\Delta i_{q1}$ and d-axis current basic compensation value $\Delta i_{d1}$ are input to the multipliers 26 and 28, respectively.

On the other hand, the correction factor calculating unit 24 calculates, as a correction factor Rm, the reciprocal 1/G of the gain G that is output from the gain/phase determining unit 16 as a gain of the current control system. The correction factor Gm is input to the multipliers 26 and 28. The multiplier 26 calculates a q-axis current compensation value $\Delta i_q$ by multiplying the q-axis current basic compensation value $\Delta i_{q1}$ by the correction factor Rm. The multiplier 28 calculates a d-axis current compensation value $\Delta i_d$ by multiplying the d-axis current basic compensation value $\Delta i_{d1}$ by the correction factor Rm. The multiplication by the correction factor Rm compensates for gain reduction due to the frequency characteristic of the current control system.

The thus-obtained q-axis current compensation value $\Delta i_q$ and d-axis current compensation value $\Delta i_d$ are output from the torque ripple compensating unit 118, and added, as described above, to the q-axis basic current instruction value $i^*_{q0}$ and the d-axis basic current instruction value $i^*_{d0}$, respectively (refer to Equations (4a) and (4b)). Resulting q-axis current instruction value $i^*_q$ and d-axis current instruction value $i^*_d$ are given to the current control system including the current control unit 200 as target values.

Figure 8:
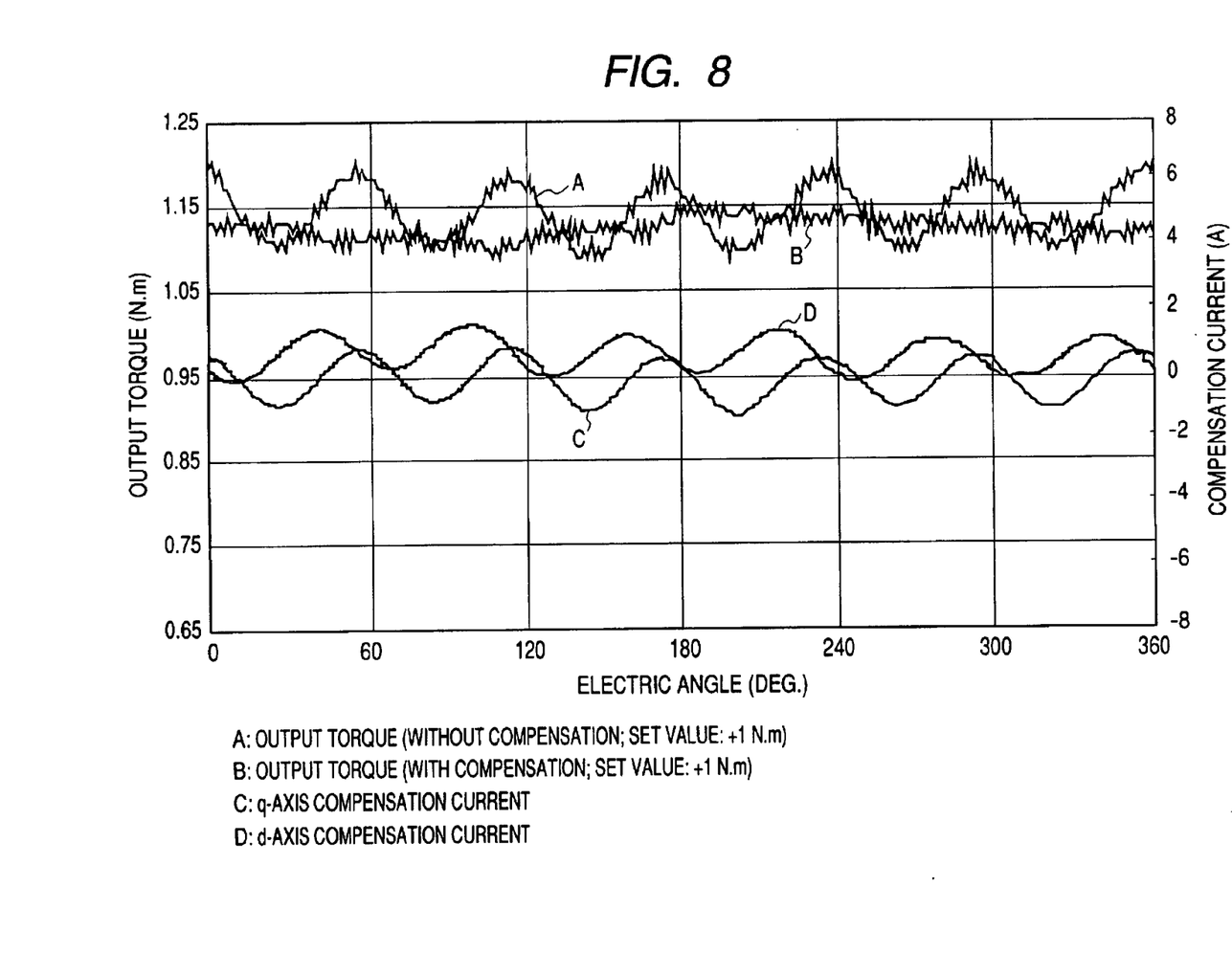
FIG. 8 is a waveform graph showing a torque ripple compensation effect in the embodiment.
Figure 9:
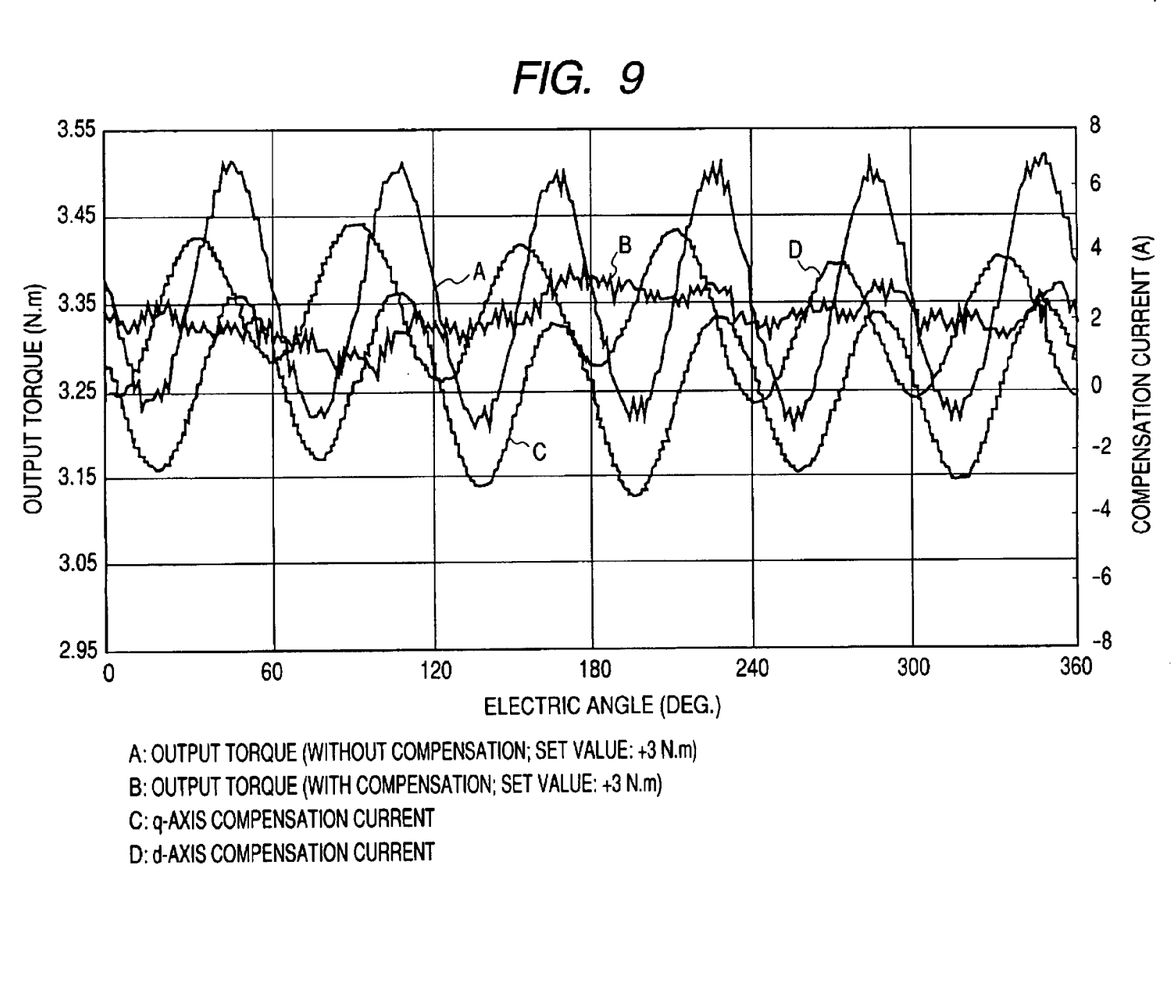
FIG. 9 is a waveform graph showing a torque ripple compensation effect in the embodiment.

FIGS. 8 and 9 are waveform graphs showing examples of the effect of the above compensation currents for electric ripple suppression. FIG. 8 shows a case that the output torque (target value) of the motor 6 is 1 N.m and q-axis current compensation values of waveform C and d-axis current compensation values of waveform D are used. As a result, the actual output torque of the motor 6 changed from torque of waveform A (without compensation) to torque of waveform B (with compensation). It is seen that torque ripples are suppressed. FIG. 9 shows a case that the output torque (target value) of the motor 6 is 3 N.m and q-axis current compensation values of waveform C and d-axis current compensation values of waveform D that are suitable for this output torque (i.e., motor load) are used. As a result, the actual output torque of the motor 6 changed from torque of waveform A (without compensation) to torque of waveform B (with compensation). It is seen that torque ripples are suppressed.

<6. Advantages>

In general, in motors used in electric power steering apparatus, the rotation speed varies every moment depending on not only the load variation but also the drive situation. Therefore, electric ripples cannot be reduced sufficiently in various drive situations merely by varying the amplitudes of compensation currents for electric ripple suppression in proportion to the motor load as in the above-described conventional technique. That is, since the current control system of the motor 6 has a frequency characteristic, the amplitudes and the phases of actual compensation currents vary with the rotation speed of the motor 6 and hence deviate from the settings.

In contrast, in the embodiment, in setting compensation current instruction values for electric ripple suppression, not only a q-axis current basic compensation value $\Delta i_{q1}$ and a d-axis current basic compensation value $\Delta i_{d1}$ that are proportional to a q-axis basic current instruction value $i^*_{q0}$ that is a physical quantity corresponding to a motor load are calculated but also the q-axis current basic compensation value $\Delta i_{q1}$ and the d-axis current basic compensation value $\Delta i_{d1}$ are multiplied by a correction factor Rm obtained by the gain/phase determining unit 16 and the correction factor calculating unit 24 so that a gain reduction due to the frequency characteristic of the current control system is compensated for. A q-axis current compensation value $\Delta i_q$ and a d-axis current compensation value $\Delta i_d$ as multiplication results are used as compensation current instruction values for electric ripple suppression. Therefore, when the rotation speed of the motor 6 has varied with the drive situation, the amplitudes of the compensation current instruction values that are represented by the q-axis current compensation value $\Delta i_q$ and the d-axis current compensation value $\Delta i_d$ are corrected in accordance with the rotation speed variation. Further, in the embodiment, an electric angle $\theta_{re}$ is corrected in accordance with a phase difference $\Delta \theta_e$ (negative value) determined by the gain/phase determining unit 16 so that a phase delay due to the frequency characteristic of the current control system is compensated for. A q-axis current unit compensation value $\Delta i_{q0}$ and a d-axis current unit compensation value $\Delta i_{d0}$ corresponding to a corrected electric angle $\theta_{mre}$ are calculated by using the compensation current map 20a, and a q-axis current compensation value $\Delta i_q$ and a d-axis current compensation value $\Delta i_d$ (mentioned above) are determined on the basis of the values $\Delta i_{q0}$ and $\Delta i_{d0}$.

As described above, in the embodiment, not only the amplitudes of the compensation currents to flow through the motor 6 to suppress electric ripples are varied in accordance with the motor load variation but also the amplitudes and the phases of the compensation current instruction values are corrected in accordance with the rotation speed of the motor 6 (i.e., in accordance with the frequency of the compensation currents) to cancel out the influences of the frequency characteristic of the current control system. Therefore, even if the rotation speed of the motor 6 varies every moment depending on not only the motor load variation but also the drive situation, proper compensation currents are supplied to the motor 6, whereby electric ripples can be suppressed sufficiently.

<7. Modifications>

In the embodiment, the 3-phase brushless motor 6 is used as a driving source of the electric power steering apparatus. However, similar advantages can be obtained by a similar configuration even if a brushless motor the number of phases of which is not equal to three is used.

Even if a DC motor with a brush is used in place of the brushless motor 6, advantages similar to the above-described advantages can be obtained by correcting the amplitudes and the phases of compensation currents for torque ripple compensation so as to compensate for a gain reduction and a phase delay due to the frequency characteristic of the current control system in setting the compensation currents.

What is claimed is:

1. An electric power steering apparatus for giving steering assist force to a steering mechanism of a vehicle by driving an electric motor on the basis of a current target value that is determined in accordance with a manipulation for steering the vehicle, the electric power steering apparatus comprising:

a rotation speed detecting unit which detects a rotation speed of the electric motor;

a compensation current determining unit which determines an instruction value of a compensation current to flow through the electric motor to suppress torque ripples due to distortion of an induced electromotive force waveform of the electric motor in accordance with a load correspondence quantity as a physical quantity corresponding to a load of the electric motor and the rotation speed detected by the rotation speed detecting unit;

a correcting unit which corrects the current target value on the basis of the compensation current instruction value determined by the compensation current determining unit; and a control unit which performs a feedback control on the electric motor so that a current having the current target value as corrected by the correcting unit flows through the electric motor, the control unit being part of a current control system of the electric motor that uses the feedback control.

2. The electric power steering apparatus according to claim 1, wherein the compensation current determining unit includes:

an amplitude determining unit which determines an amplitude of the compensation current instruction value so that an amplitude of the compensation current to flow through the electric motor becomes proportional to the load correspondence quantity; and an amplitude correcting unit which corrects the determined amplitude in accordance with the rotation speed so as to compensate for a gain reduction due to a frequency characteristic of the current control system.

3. The electric power steering apparatus according to claim 2, wherein the compensation current determining unit includes a phase correcting unit which corrects a phase of the compensation current instruction value in accordance with the rotation speed so as to compensate for a phase delay due to the frequency characteristic of the current control system.

4. The electric power steering apparatus according to claim 1, wherein the compensation current determining unit includes:

an amplitude determining unit which determining an amplitude of the compensation current instruction value so that an amplitude of the compensation current to flow through the electric motor becomes proportional to the load correspondence quantity; and a phase correcting unit which corrects a phase of the compensation current instruction value in accordance with the rotation speed so as to compensate for a phase delay due to the frequency characteristic of the current control system.

* * * * *